Aug. 2, 1927.
I. ANDREWS
LOOM HARNESS SUPPORT
1,637,796
Original Filed June 16, 1925
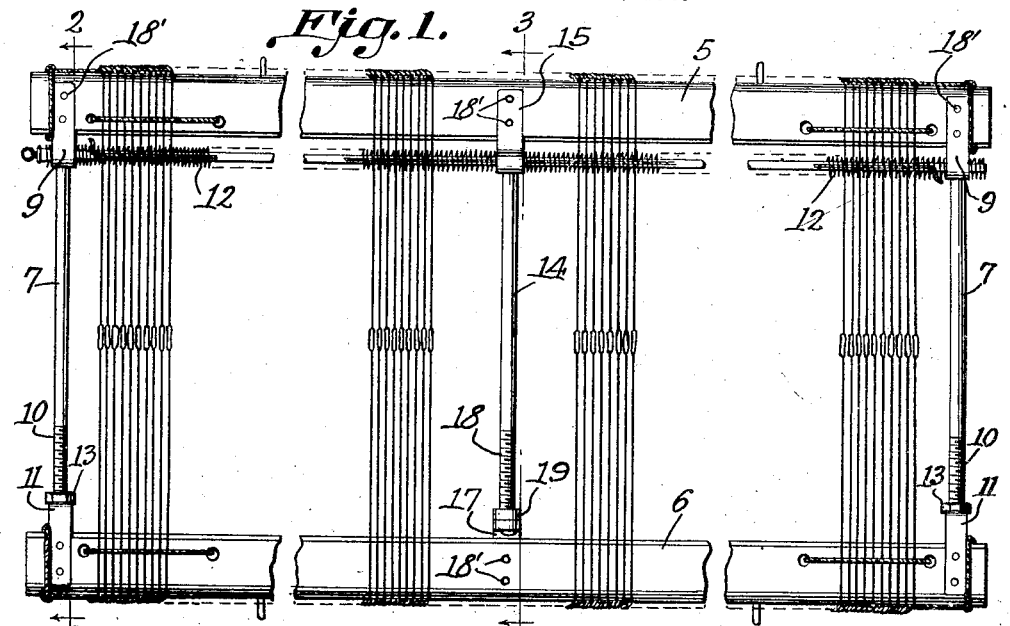
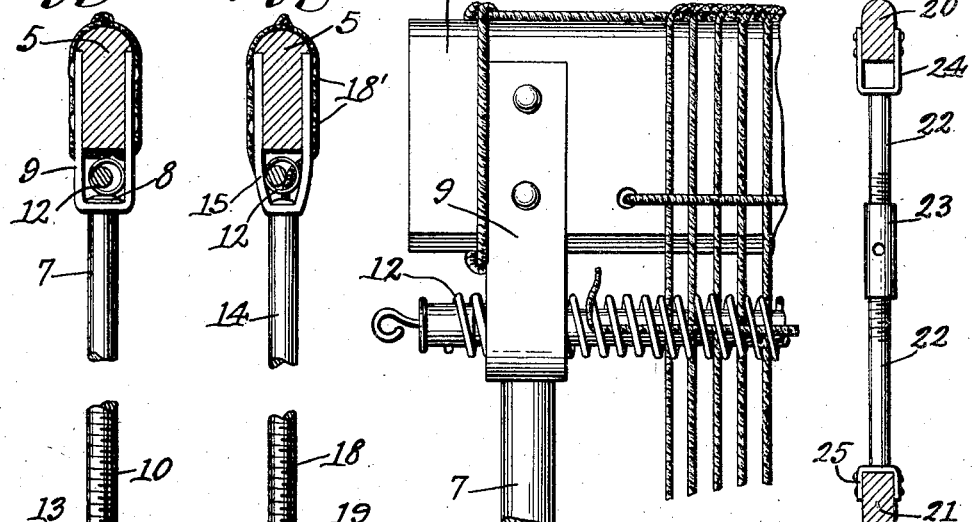
Inventor
Isaac Andrews
By C. A. Snow & Co.
Attorneys Patented Aug. 2, 1927.

1,637,796

UNITED STATES PATENT OFFICE.

ISAAC ANDREWS, OF SPARTANBURG, SOUTH CAROLINA.

LOOM-HARNESS SUPPORT.

Application filed June 16, 1925, Serial No. 37,512. Renewed February 23, 1927.

This invention relates to an improved loom, harness supporter, the primary object of the invention being to provide a rigid adjustable frame for the shade of the harness.

Another important object of the invention is to relieve the harness eyes of undue strain, which is ordinarily directed thereto when the harness is in operation in the loom, thereby preventing the eyes of the harness being pulled together, to obstruct the operation of the loom, to permit the twine of the harness to be maintained in a loose condition and at the same time relieve the twine of undue strain under the action of the jack strap of the loom.

A further object of the invention is to provide adjustable means at the ends of the loom harness to enable the attendant in charge of the loom to adjust the harness to the desired tension.

A still further object of the invention is the provision of means to hold the loom harness shafts in spaced relation with each other at all times to insure against the buckling or bending of the twine while the harness is being stored.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is an elevational view of a loom harness constructed in accordance with the invention.

Figure 2 is a sectional view taken on line 2—2 of Figure 1.

Figure 3 is a sectional view taken on line 3—3 of Figure 1.

Figure 4 is an enlarged fragmental detail view illustrating one end of the loom harness and Figure 5 is a sectional view illustrating a modified form of connecting means, for the harness shafts.

Referring to the drawing in detail, the loom harness includes the harness shafts 5 and 6 respectively which act as supports for the twine harness that is connected thereto in the usual and well known manner.

The harness shafts 5 and 6 are held in spaced relation with each other and supported in such spaced relation by means of the connecting rods 7 arranged at the ends of the harness shafts and as shown, these rods 7 are provided with heads 8 at one of their respective ends, the heads being formed for the purpose of engaging the U-shaped connecting member 9 associated therewith in such a way as to allow the rods 7 to move within the U-shaped connecting member 9 associated therewith.

The opposite ends of the rods 7 are threaded as at 10 and are adapted to move through threaded openings formed in the connecting members 11 which are inverted U-shaped and adapted to embrace portions of the lower harness shaft 6. The connecting members 9 embrace portions of the upper harness shaft and as shown have portions thereof arranged in spaced relation with the harness shaft with which it is connected, providing a support for the spring member 12 employed as a means for holding the twine of the harness in proper spaced relation.

Lock nuts 13 are also provided on the threaded extremities of the rods 7 so that when an adjustment of the rods 7 has been made, the lock nuts may be operated to lock the rods to the members 11 and insure against the rod moving to change the tension on the twine of the harness.

In order that the central portion of an exceptionally long loom harness will be braced, a connecting rod such as indicated at 14 is provided at a point intermediate the ends of the shafts, which rod is formed with a head to cooperate with the U-shaped connecting member 15 in such a way as to permit of rotary movement of the rod with respect to the connecting member. The portions of the connecting member 15 at points adjacent to the rod 14, are inclined towards the rod 14, thereby eliminating abrupt shoulders that would tend to wear the twine of the harness.

At the lower end of the rod 14 is a connecting member 17 that is secured to one side of the lower harness shaft so that the central rod 14 may be readily and easily removed. Threads 18 are provided on the rod 14 and operate through a threaded opening in the connecting member 17, the nut 19 being provided on the rod to lock the same in its position of adjustment. These connecting members are connected to the loom shafts by means of the securing nails 18'.

In the form of the invention as illustrated by Figure 5 of the drawing, the harness shafts are indicated by the reference characters 20 and 21 respectively, which are held in suitably spaced relation with each other by means of the rods 22 that have their adjacent ends threaded to receive the turn buckle 23 so that the rods 22 may be moved towards and away from each other to adjust the harness shafts with respect to each other.

Formed at the outer ends of the rods 22 are connecting members 24 and 25 that embrace portions of the shafts associated therewith to secure the rods thereto. The upper connecting member 24 is of a length to provide a space between the upper loom shaft and the inner portion of the connecting member to provide a support for the usual spring spacing member employed in loom harnesses.

From the foregoing it will be obvious that due to this construction, the weight of the loom harness under the action of the jack strap, and the sudden jar directed thereto by the jack strap of the loom is taken up by the connecting members at the ends of the loom shafts, thereby greatly increasing the life of the twine of the loom harness.

I claim:—

In a device of the character described, harness shafts, substantially U-shaped connecting members secured to the shafts adjacent to the ends thereof, an adjusting rod at each end of the shafts, each of said adjusting rods having a head at its upper end to permit the rod to rotate with respect to the upper connecting member associated therewith, the opposite ends of the rods being threaded and passed through threaded openings in the lower connecting member associated therewith, and lock nuts for holding the connecting rods against movement.

In testimony that I claim the foregoing as my own, I have hereto affixed my signature.

ISAAC ANDREWS.